United States Patent [19]

Suzuki

[11] Patent Number: 4,531,054
[45] Date of Patent: Jul. 23, 1985

[54] WAVEFRONT LIGHT BEAM SPLITTER

[75] Inventor: Takeomi Suzuki, Tokyo, Japan

[73] Assignee: Asahi Kogaku Kogyo Kabushiki Kaisha, Tokyo, Japan

[21] Appl. No.: 403,472

[22] Filed: Jul. 30, 1982

[30] Foreign Application Priority Data

Jul. 31, 1981 [JP] Japan .................. 56-119325

[51] Int. Cl.³ .................. G01J 1/20
[52] U.S. Cl. .................. 250/201; 350/171; 350/172
[58] Field of Search .................. 350/171, 172; 356/124; 250/201 PF, 204, 216, 578

[56] References Cited

U.S. PATENT DOCUMENTS 3,844,658  10/1974  Gela et al. .................. 250/201
4,341,953   7/1982  Sakai et al. .................. 250/201

Primary Examiner—David C. Nelms
Assistant Examiner—J. Jon Brophy
Attorney, Agent, or Firm—Browdy & Neimark

[57] ABSTRACT

A light beam splitter for splitting a light beam from a focusing lens to obtain two split light beams incident on respective light receiving elements, as a pair, wherein a total reflection film is formed to one side of a substantial boundary surface constituted by a plane containing the optical axis of said focusing lens so that said light beam is split into two by said total reflection film, and said pair light receiving elements are disposed such that the split light beam transmitted through a region free from said total reflection film is received by one of the light receiving elements while the split light beam reflected in a region where said total reflection film is situated is received by the other light receiving element.

9 Claims, 6 Drawing Figures

A light receiving element 2a is provided with its light receiving surface disposed on the optical axis 1a and directed toward a focusing lens 1. The total reflection film 5 is provided on either side of a substantial boundary surface constituted by a plane containing the optical axis 1a.

WAVEFRONT LIGHT BEAM SPLITTER

FIELD OF THE INVENTION

The present invention relates to light beam splitters, such as are used for automatic focusing devices, light measuring devices, etc., for splitting a light beam from a focusing lens into a pair of beams incident on respective light receiving elements.

BACKGROUND OF THE INVENTION

Heretofore, as light beam splitting means for splitting a light beam into two beams incident on respective light receiving elements disposed at positions spaced apart from each other, there has been an amplitude division method making use of a semi-transparent mirror.

For varying the ratio between the transmittivity and reflectivity of the semi-transparent mirror which effects the aplitude-based beam splitting, it has been a practice to deposit a metal (such as Al, Ag, Cr or Au) or a non-metal (such as ZnS, CeO, $TiO_2$) of a suitable thickness.

However, it has been very difficult to control the ratio of the light beam splitting by controlling the film thickness. In addition, light is greatly absorbed, and also the division ratio is subject to great variations with respect to polarization and wavelengths.

The present invention accordingly seeks to solve the above problems through wavefront splitting instead of the amplitude splitting as effected by the prior art semi-transparent mirrors.

DETAILED DESCRIPTION OF THE PREFERRED EMBODIMENTS

Figure 1:
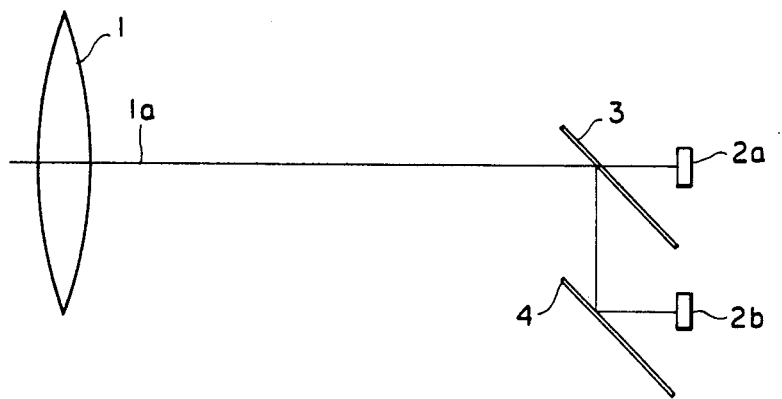
FIG. 1 is an optical diagram showing a prior art light beam splitter using a semi-transparent mirror.

In FIG. 1, prior art, designated at 1 is a focusing lens, and at 2a and 2b light receiving elements. The light receiving element 2a is provided on the optical axis 1a of the focusing lens 1 and behind a semi-transparent mirror 3. The semi-transparent mirror 3 is disposed on the optical axis 1a such that it is inclined with respect thereto, and it serves to split the light beam from the focusing lens 1 and reflects a split light beam to be incident on a light receiving element 2a provided at another position. The light receiving element 2b has the same direction as the light receiving element 2a, and accordingly a mirror 4 is provided to turn the split beam.

FIGS. 2 through 6 show embodiments of the present invention. Like or equivalent parts to those in the prior art are designated by like reference numbers.

In the figures, designated at 5 is a total reflection mirror, which may be a reflection film used for ordinary mirrors. This means that the mirror 4 may be one constituted by the total reflection mirror 5. The total reflection mirror 5 is made of a high reflectivity material so that it can effect total reflection. Designated at 6 is a transparent member such as glass on which the reflection film is formed or deposited. Although not shown in the figures, the transparent member 6 is divided into blocks as necessary, and after forming the reflection film by means of deposition these blocks are bonded together into a single body to fix the positional relation of the reflection film thereto.

A light receiving element 2a is provided with its light receiving surface disposed on the optical axis 1a and directed toward a focusing lens 1. The total reflection film 5 is provided on either side of a substantial boundary surface constituted by a plane containing the optical axis 1a.

Figure 2:
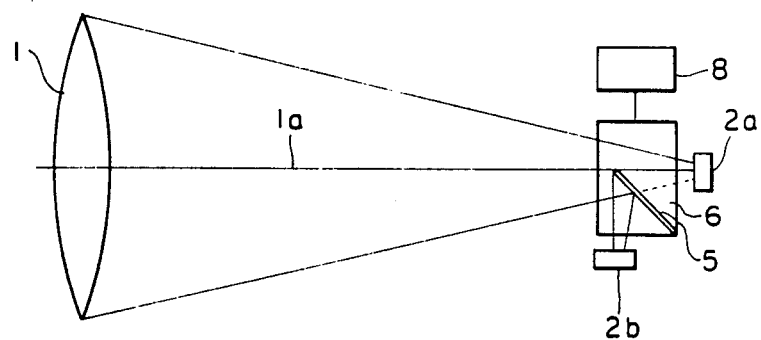
FIGS. 2 through 6 show embodiments of the light splitter according to the present invention, with FIG. 2 showing a case where two light receiving elements are arranged in a perpendicular arrangement and the other figures showing cases where two light receiving elements are arranged in a parallel arrangement while a total reflection film is disposed at different positions.

In the example of FIG. 2, another light receiving element 2b is provided with its light receiving surface directed to the light reflected by the total reflection film 5, i.e., in a direction perpendicular to the optical axis 1a.

Figure 3:
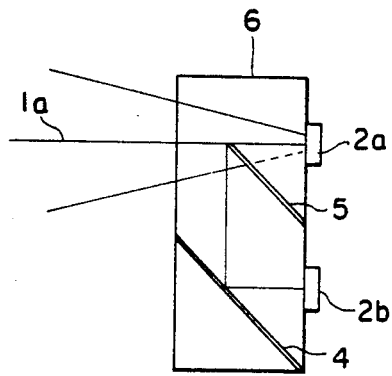

FIGS. 3 through 6 show examples, in which light receiving element 2b is disposed with its light receiving surface directed in the same direction as the light receiving surface of the light receiving element 2a. In the example of FIG. 3, total reflection film 5 which is inclined with respect to the optical axis 1a is provided on the side of the boundary surface constituted by a plane containing the optical axis 1a nearer the light receiving element 2a.

Figure 4:
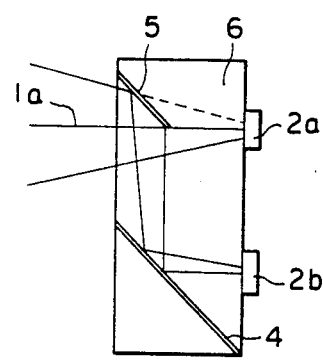

In the example of FIG. 4, the total reflection film 5 is provided on the side remote from the light receiving element 2a, while the rest of the arrangement is the same as in the case of FIG. 3.

Figure 5:
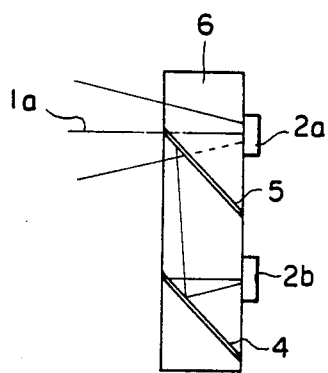

In the example of FIG. 5, the transparent body 6 is reduced in size to reduce the side of the mirror 4 such that it corresponds to the size of the total reflection film 5 shown in FIG. 3.

Figure 6:
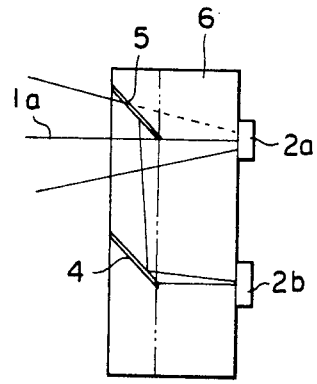

In the example of FIG. 6, the mirror 4 is made to have a size corresponding to the size of the total reflection film shown in FIG. 4.

The examples of FIGS. 5 and 6 are free from waste in manufacture, and also they can be readily manufactured.

The effects will now be described.

A light beam from the focusing lens 1 is subjected to wavefront splitting by the total reflection film 5, which is provided on one side of the substantial boundary surface constituted by a plane containing the optical axis 1a. The split light beam which is transmitted through a region free from the total reflection film 5 is received by the light receiving element 2a, while the split light beam which is reflected in the region where the total reflection film 5 is situated is received by the other light receiving element 2b. In the case of FIG. 2, light is directly received by the light receiving element 2b, while in the case of FIGS. 3 to 6 it is received by the light receiving element 2b after being reflected by the mirror 4.

While the light beam is divided in the above manner, for varying light beam division ratio the reflection area and transmission area are varied by moving the total reflection film 5 to either side with respect to the boundary surface constituted by a plane containing the optical axis 1a. Such as by means of an adjusting apparatus schematically shown in FIG. 2 as block 8.

As has been described in the foregoing, according to the present invention, which uses a total reflection film and according to which the position thereof, i.e., the ratio between the reflection area and transmission area, is varied to obtain a desired wavefront division ratio, the light beam division ratio can be very controlled compared to the case of control using the film thickness of the prior art. Besides, the control need not be done during the formation of the reflection film but can be obtained by movement caused at the time of the mounting. Thus, it is possible to alter the light beam division ratio at any time. Further, since this reflection film is a total reflection film, light absorption is less likely, and also the division ratio is subject to less fluctuations with respect to polarization and wavelengths.

It will be obvious to those skilled in the art that various changes may be made without departing from the scope of the invention and the invention is not to be considered limited to what is shown in the drawings and described in the specification.

What is claimed is:

1. A light beam splitter for splitting a light beam from a focusing lens to obtain two split light beams each incident on one of the pair of light receiving elements comprising:

a total reflection film, said film being positioned to one side of a plane containing the optical axis of the focusing lens so that the light beam from the focusing lens is split in two by said total reflection film, said film being further disposed such that the split light beam transmitted through a region free from said total reflection film is received by one of the light receiving elements while the split light beam reflected in a region where said total reflection film is situated is directed towards the other light receiving element.

2. The light beam splitter of claim 1, wherein said total reflection film is formed into a block of optically transparent material.

3. The light beam splitter of claim 1 or 2, wherein said pair of light receiving elements are positioned in parallel with each other, and further including mirror means redirecting at least one of said split beams.

4. The light beam splitter of claim 1 or 2, wherein said pair of light receiving elements are positioned at right angles to each other.

5. The light beam splitter of claim 2, further including mirror means formed into said block of optical material, means to mount said pair of light receiving means on one surface of said block and means to position said reflection film and said mirror means in said block such that one of said split beams passes through said block to directly impinge a first one of said light receiving means and a second one of said split beams reflects off of both said reflection film and said mirror means to impinge the second one of said light receiving means.

6. The light beam splitter of claims 1 or 2, and further including means to move said total reflection film with respect to said plane, whereby the ratio of the portions of said beam from said focusing lens going into said first and second light receiving elements can be controlled.

7. A light beam splitter combination, comprising:

a focusing lens;

total reflection means for totally reflecting any light beam impinging thereon, said reflection means being positioned to one side of a plane containing the optical axis of said focusing lens so that the light beam from said focusing lens is split in two by said reflecting means, the first portion of said split beam being reflected by said reflecting means and the second portion being transmitted through a region free from said reflecting means;

a first light receiving element disposed with respect to said focusing lens and said reflecting means so as to receive said first portion of said split beam; and a second light receiving element disposed with respect to said focusing lens and said reflecting means so as to receive said second portion of said split beam.

8. A light beam splitter combination in accordance with claim 7 and further including ratio variation means for causing the ratio of the amount of the light beam in said first and second portions of the split beam to vary.

9. A light beam splitter combination in accordance with claim 8 wherein said ratio variation means comprises adjusting means for adjusting the position of said reflecting means with respect to said focusing lens such as to cause a greater or lesser portion of the light beam coming from said focusing lens to be intercepted by said reflecting means depending on the position of said reflecting means as set by said adjusting means.

* * * * *